US011139914B2

(12) United States Patent
Andgart et al.

(10) Patent No.: US 11,139,914 B2
(45) Date of Patent: Oct. 5, 2021

(54) DETECTION OF PUNCTURED RESOURCES

(71) Applicant: TELEFONAKTIEBOLAGET LM ERICSSON (PUBL), Stockholm (SE)

(72) Inventors: Niklas Andgart, Södra Sandby (SE); Majid Gerami, Lund (SE); Mårten Sundberg, Årsta (SE); Jonas Fröberg Olsson, Ljungsbro (SE); Caner Kilinc, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 41 days.

(21) Appl. No.: 16/478,949

(22) PCT Filed: Nov. 20, 2017

(86) PCT No.: PCT/SE2017/051148
§ 371 (c)(1),
(2) Date: Jul. 18, 2019

(87) PCT Pub. No.: WO2018/143848
PCT Pub. Date: Aug. 9, 2018

(65) Prior Publication Data
US 2019/0349126 A1    Nov. 14, 2019

Related U.S. Application Data

(60) Provisional application No. 62/455,215, filed on Feb. 6, 2017.

(51) Int. Cl.
*H04L 1/00* (2006.01)
*H04L 1/18* (2006.01)
*H04L 5/00* (2006.01)

(52) U.S. Cl.
CPC .......... *H04L 1/0038* (2013.01); *H04L 1/0013* (2013.01); *H04L 1/1812* (2013.01); *H04L 5/0007* (2013.01)

(58) Field of Classification Search
CPC ... H04L 1/0038; H04L 1/0068; H04L 1/1864; H04L 1/0057; H04L 1/0013;
(Continued)

(56) References Cited

U.S. PATENT DOCUMENTS

| | | | |
|---|---|---|---|
| 2019/0268107 A1* | 8/2019 | Yasukawa | H04L 1/1861 |
| 2020/0015251 A1* | 1/2020 | Takeda | H04W 72/1242 |
| 2020/0127763 A1* | 4/2020 | Yasukawa | H04W 72/12 |

OTHER PUBLICATIONS

3GPP TR 38.802 V1.0.0, "3rd Generation Partnership Project; Technical Specification Group Radio Access Network; Study on New Radio (NR) Access Technology Physical Layer Aspects, (Release 14)", Nov. 2016, pp. 1-64.
(Continued)

*Primary Examiner* — Peter Chen
(74) *Attorney, Agent, or Firm* — Patent Portfolio Builders PLLC

(57) ABSTRACT

A receiver blindly determines which parts of the soft buffer to flush by comparing the reception of a first transmission to the reception of a second transmission (i.e., a re-transmission of the first transmission). Any large differences between the first and second transmissions are identified as puncturing events. After identifying the location of the puncturing events, the receiver then evaluates different hypotheses about which one of the transmissions was punctured in the different events. For each of the hypotheses the receiver attempts to decode the received data and the receiver stops processing once decoding is successful or after the receiver has processed all of the hypotheses.

31 Claims, 11 Drawing Sheets

(58) Field of Classification Search
CPC ... H04L 1/0067; H04L 1/0046; H04L 1/1812; H04L 1/1816; H04L 1/1819; H04L 5/0053; H04L 5/0055; H04L 5/0007; H04W 72/042; H04W 72/0446; H04W 72/1289; H04W 72/0413; H04W 72/1284
See application file for complete search history.

(56) References Cited

OTHER PUBLICATIONS

Interdigital Communications, "Efficient multiplexing of traffic for different use cases", 3GPP TSG-RAN WG1 Meeting #86, Gothenburg, Sweden, R1-167331.

International Search Report and Written Opinion, dated May 23, 2018, from corresponding/related International Application No. PCT/SE2017/051148.

NTT Docomo, Inc., "On multiplexing of eMBB and URLLC in downlink", 3GPP TSG RAN WG1 AH_NR Meeting, Jan. 16-20, 2017, Spokane, Washington, R1-1700626.

Samsung, "Evaluation results of partial retransmission for eMBB", 3GPP TSG RAN WG1 Meeting NR#1, Jan. 16, 2017, Spokane, Washington, R1-1700960.

Samsung, "Performance of eMBB Receiver with Blind Detection of URLLC", 3GPP TSG RAN WG1 Meeting #87, Nov. 14-18, 2016, Reno, Nevada, R1-1612539.

ZTE, ZTE Microelectronics, "Multiplexing of eMBB and URLLC", 3GPP TSG RAN WG1 Meeting #86, Aug. 22-26, 2016, Gothenburg, Sweden, R1-166408.

* cited by examiner

DETECTION OF PUNCTURED RESOURCES

CROSS-REFERENCE TO RELATED APPLICATIONS

The present application is a U.S. National Stage filing of International Patent Application No. PCT/SE2017/051146 filed Nov. 20, 2017, which claimed the benefits of U.S. Provisional Patent Application No. 62/455,215, filed Feb. 6, 2017, the entire contents of which are incorporated herein by reference.

BACKGROUND OF THE INVENTION

Wireless communications occur in an environment with unpredictable interference and channel variations. HARQ (Hybrid Automatic Repeat Request) is a common technique used to address the unpredictable interference and channel variations. HARQ involves a wireless device receiving a downlink transmission to attempt to decode a data message in the transmission.

FIG. 1 is a signaling diagram of a conventional HARQ technique employed between transmitter 105 and receiver 110 in an LTE system. Initially, the transmitter 105 transmits up to two transport blocks in a TTI (Transmission Time Interval) to receiver 110 (step 115). An example of this transmission is illustrated in FIG. 2 in which $TTI_1$ includes two transport blocks and $TTI_2$ includes two transport blocks. Receiver 110 then determines whether each of the two transport blocks was successfully received (step 120). Because LTE provides for up to two transport blocks per TTI, the receiver 110 transmits a HARQ-ACK consisting of 2 bits, each bit indicating success of failure of a respective transport block (step 125).

The transmitter then determines, based on the value of the bits in the HARQ-ACK, whether one or more transport blocks were not successfully decoded (step 130). If so, the transmitter 105 transmits the unsuccessfully decoded transport block(s) to the receiver 110 (step 135). The receiver 110 then attempts to decode the unsuccessfully decoded transport block by soft combining it with the retransmitted transport block (step 140). The type of soft combining can vary, and can involve the well-known Chase or Incremental Redundancy soft combining techniques. Soft combining greatly increases the probability of successful decoding.

LTE, which is a standard in 3GPP family of wireless systems, is highly optimized for MBB (Mobile BroadBand) traffic. The TTI (subframe) has 1 ms duration and, for FDD (Frequency Division Duplex) the HARQ-ACK is transmitted in subframe n+4 for a data transmission in subframe n.

URLLC (Ultra-Reliable Low Latency Communication) is data service with extremely strict error and latency requirements, including error probabilities as low as $10^{-5}$ or lower and end-to-end latency or lower 1 ms. Other services have similar error and latency requirements, such as the so-called short TTI in LTE.

Although the fifth generation of mobile telecommunications and wireless technology is not yet fully defined, it is in an advanced draft stage within 3GPP and includes work on 5G New Radio (NR) Access Technology. Accordingly, it will be appreciated that although LTE terminology is used throughout, the disclosure equally applies to equivalent 5G entities or functionalities despite the use of terminology differing from what is specified in 5G. 3GPP TR 38.802 V1.0.0 (2016-11) provides a general description of the current agreements on 5G New Radio (NR) Access Technology and final specifications may be published inter alia in the future 3GPP TS 38.2** series.

MBB and URLLC are both among a wide range of data services being targeted for 5G. To enable services with an optimized performance, the TTI lengths are expected to be different for different services, wherein a TTI may correspond to a subframe, a slot, or a mini-slot. Specifically, URLLC may have a shorter TTI length compared to MBB.

Situations may occur when an MBB transmission is transmitted when a URLLC data packet arrives at the transmitter. In order to achieve the strict latency requirements of URLLC, the MBB transmission may be blanked (i.e., interrupted) in certain time-frequency resources so that a URLLC transmission can be performed on those resources. An example of this is illustrated in FIG. 3, in which a portion of the time-frequency region of an MBB transmission is punctured by a URLLC transmission (i.e., the time-frequency region occupied by the white rectangle). Although this puncturing allows the URLCC transmission to comply with the strict latency requirements, the receiver will receive only a portion of the MBB transmission and therefore the receiver may, with high probability, fail to decode the MBB transmission. HARQ soft combining may not be an ideal solution because the soft buffer will be partly corrupted for the resource where the first transmission was blanked. The receiving wireless device may be unaware that a portion of the MBB transmission was blanked, and therefore unaware of the corrupted resource stored in the before, which will then require a larger number of HARQ retransmissions is required for correct decoding than if the receiving wireless device had been aware of the resource blanked by the transmitter.

SUMMARY OF THE INVENTION

Some exemplary embodiments of the present invention are directed to techniques allowing the receiver to blindly determine which parts of the soft buffer to flush. This is achieved by having the receiver compare the reception of a first transmission to the reception of a second transmission (i.e., a retransmission of the first transmission). Because the first and second transmissions should contain identical sets of information the difference between the two should be low. Thus, any large difference can be classified as a puncturing event. After identifying the location of the puncturing events, the receiver then evaluates different hypotheses about which one of the transmissions was punctured in the different events. For each of the hypotheses the receiver attempts to decode the received data and the receiver stops processing once decoding is successful or after the receiver has processed all of the hypotheses.

According to one aspect of the invention, a receiving node performs a method involving receiving a data transmission from a transmitting node and comparing values of the received data transmission with values of previously received data transmission to determine a difference between the values of the received data transmission and the values of the previously received data transmission. The determined difference is compared to a threshold to detect regions with corrupted data of one of the data transmission and/or regions with corrupted data of the previously received data transmission. A hypothesis is selected from a hypotheses list and based on the selected hypothesis values are cleared from a buffer according to the selected hypothesis, sets of values are soft combined according to the selected hypothesis to produce combined values and an attempt to decode the combined values is performed. When the attempt to decode is not successful and when the hypotheses list includes another hypothesis, the other hypothesis is selected from the hypotheses list and the clearing, soft combining, and attempting to decode are performed according to the other hypothesis.

Other aspects of the invention are directed to a receiving node for carrying out this method, as well as a computer-readable medium comprising code, which when executed by a processor, causes the processor to perform this method.

Exemplary embodiments of the present invention are also directed to flushing buffers containing data punctured by a transmission for another data service.

An aspect of the invention is directed to a method implemented in a receiving node. The method involves receiving a first transmission from a transmitting node and obtaining a blanking indicator, which is based on physical layer properties of the first transmission and which indicates the first transmission was partially blanked. The receiving node identifies a subset of soft information of the first transmission based on the blanking indicator. The receiving node decodes the first transmission using soft information of the first transmission except for the identified subset of soft information.

Other aspects of the invention are directed to a receiving node for carrying out this method, as well as a computer-readable medium comprising code, which when executed by at least one processor, causes the processor to perform this method.

Another aspect of the invention is directed to a method implemented in a transmitting node. This method involves the transmitting node transmitting a first transmission to a first receiving node over a first antenna beam and transmitting a second transmission to a second receiving node over a second antenna beam. The transmitting node provides a blanking indicator to the first receiving node indicating a portion of the first transmission that was blanked during transmission of the second transmission, wherein the blanking indicator is based on physical layer properties of the first transmission.

Other aspects of the invention are directed to a transmitting node for carrying out this method, as well as a computer-readable medium comprising code, which when executed by at least one processor, causes the processor to perform this method.

Another aspect of the invention is directed to a method implemented in a transmitting node. The method involves transmitting a data transmission to a receiving node, transmitting a retransmission of the data transmission to the receiving node, and providing the receiving node with information regarding punctured resources in the data transmission or in the retransmission.

Other aspects of the invention are directed to a transmitting node for carrying out this method, as well as a computer-readable medium comprising code, which when executed by at least one processor, causes the processor to perform this method.

BRIEF DESCRIPTION OF THE DRAWING FIGURES

DETAILED DESCRIPTION

One solution for addressing the blanking of one data service in favor of a transmission for another data service can be to use the LTE 1-bit NDI (New Data Indicator) flag, which has a value that is changed every time new data is transmitted. In LTE, toggling the NDI flag indicates to the receiving wireless device that it should reset or flush the soft buffer, e.g., the entire soft buffer, so that it does not attempt to combine old data with new data. Thus, when an MBB transmission is partly blanked by a URLLC transmission, the transmitter can toggle the NDI flag for the retransmitted data, which will cause the receiving wireless device to flush its soft buffer and will accordingly not combine the retransmitted data with the original corrupted data. This solution, however, may not provide optimal bit efficiency because, due to the flushing of the buffer, the received non-punctured data will not be combined with retransmitted data.

Figure 1:
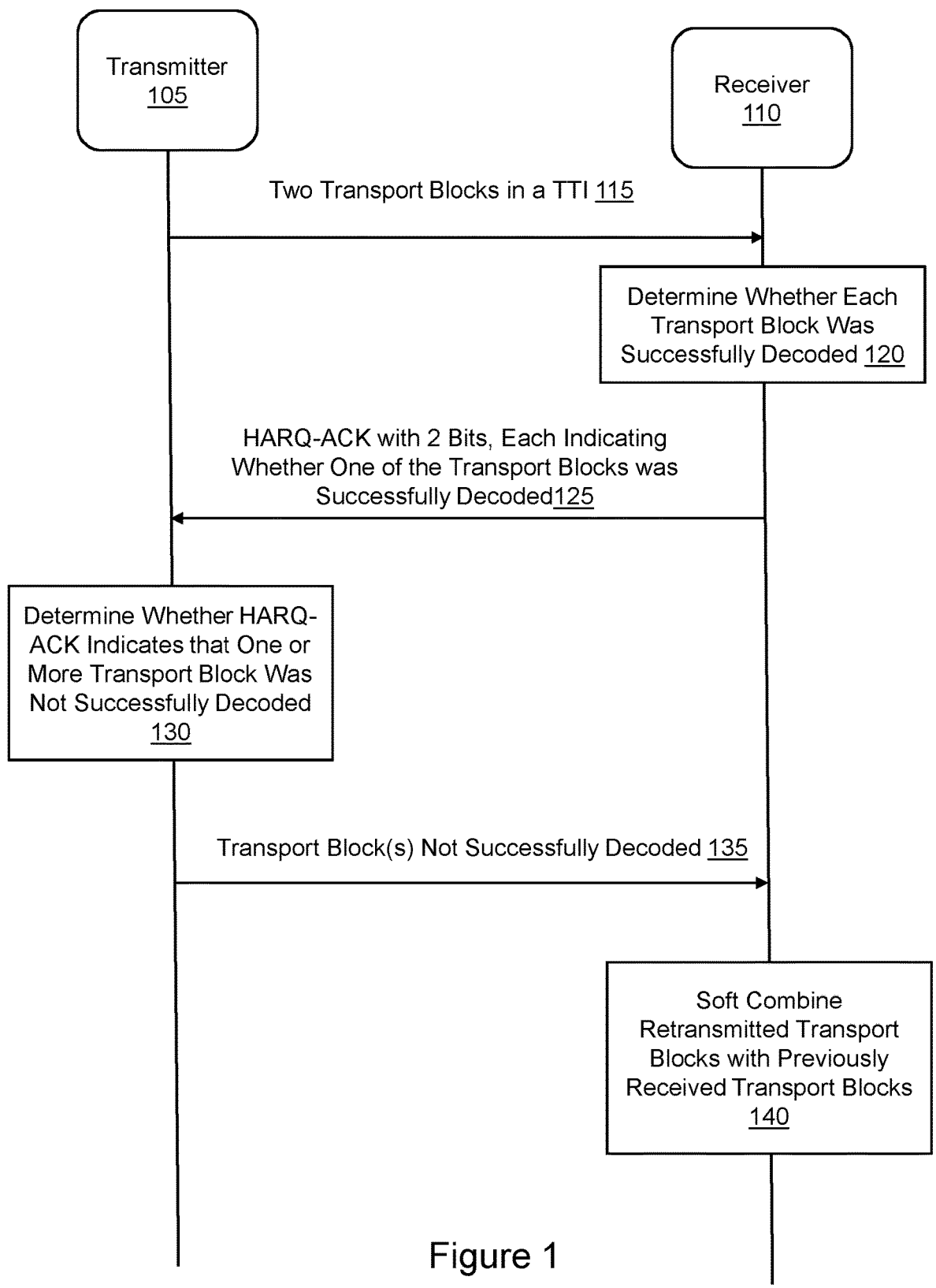
FIG. 1 is a signaling diagram of a conventional HARQ process.
Figure 2:
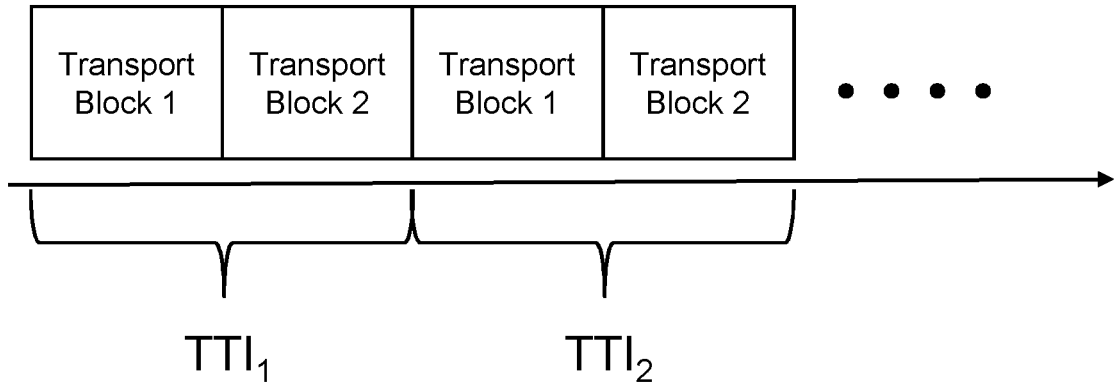
FIG. 2 is a block diagram of conventional transport block transmissions.
Figure 4A:
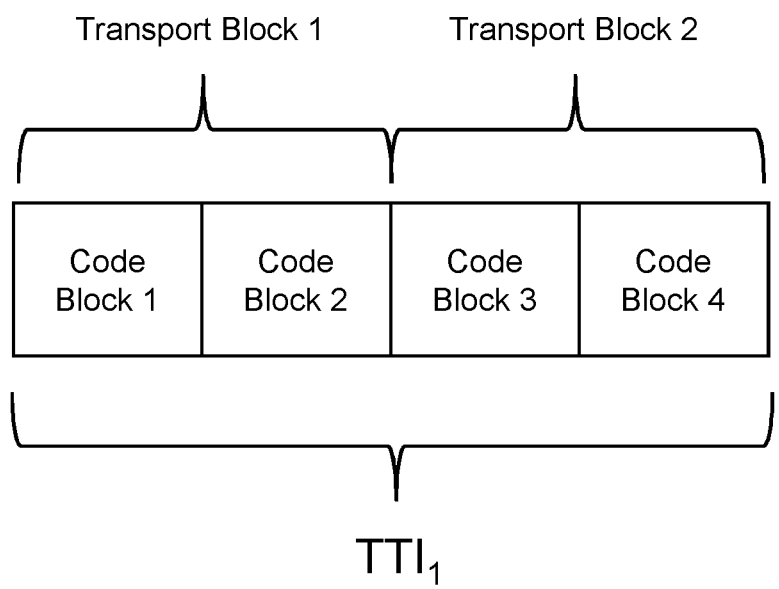
FIG. 4A is a block diagram of transport block transmissions in accordance with exemplary embodiments of the present invention.
Figure 3:
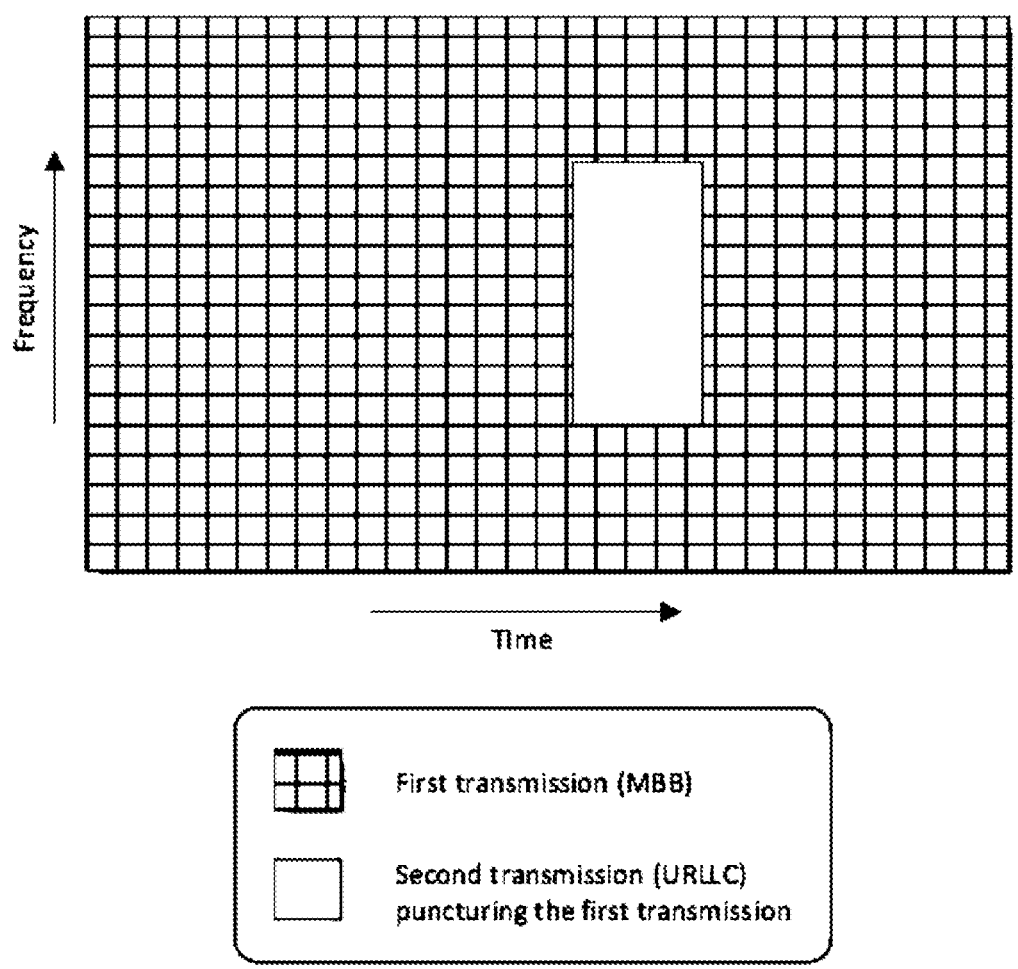
FIG. 3 is a block diagram of a transmission for a first service being punctured by a transmission for a second service.

The sub-optimal bit efficiency can be addressed by dividing the transport blocks into one or more code blocks, each code block being associated with a CRC (Cyclic Redundancy Check) value. An example of this is illustrated in FIG. 4A, where a $TTI_1$ includes two transport blocks (Transport Block 1 and Transport Block 2), each transport block including two code blocks (Transport Block 1 includes Code Blocks 1 and 2; and Transport Block 2 includes Code Blocks 3 and 4). The receiver can then have its soft buffer divided into as many soft-buffers as there are code blocks in a TTI. An example of this is illustrated in FIG. 4B, in which HARQ buffer 402 includes buffers 404-410, each corresponding to one of the four code blocks transmitted in a TTI. FIG. 4B illustrates a single HARQ buffer but in practice a receiver may have more than one HARQ buffer, each HARQ buffer corresponding to a separate HARQ process, e.g., LTE provides for up to eight concurrent HARQ processes and therefore eight different HARQ buffers. Further, although the code blocks have been illustrated as being divided in the time domain, the code blocks can be divided in both the time and frequency domains. Thus, if a transmission is divided into X slots in time and Y slots in frequency, the transmission would be divided into X×Y code blocks, each code block having a CRC. The receiver could have a soft buffer divided into X×Y soft buffers, one for each of the code blocks.

The use of code blocks increases bit efficiency because if a URLLC is punctured into a transmission during a TTI, it is possible that, due to the shorter TTI of URLLC, only one of the four code blocks are blanked. Therefore, only the buffer corresponding to the blanked code block needs to be flushed instead of flushing a buffer corresponding to a transport block occupying one-half of the TTI. However, the transmitter would need to indicate in the assignment of the retransmission which of the soft-buffers needs to be flushed. This requires several bits to indicate which one of soft-buffers was affected by the puncturing, which may increase the control signaling overhead.

A related solution can involve using a CRC bitmap to indicate code blocks transmitted after the punctured part. For example, CRC=00000 may indicate a correct decoding (without blanking) and will be used for the code block preceding a punctured code block. Assuming, for example, the second code block is punctured, then the third, fourth, and so on, a CRC will be attached with a CRC=01000 bitmap. A problem with this solution is that the meaning of CRC=01000 is ambiguous to the receiver because it could mean "correct, but blanked in original transmission" or "incorrect due to normal error (i.e., not blanking)". The receiver may need to treat both 00000 and 01000 as valid correct decoding, and thus the probability the receiver considers an erroneous decoding as correct will increase. Another problem with this solution is that the receiver cannot be notified when the blanking occurs in the last code block.

Exemplary embodiments of the present invention provide techniques for a receiver to blindly detect punctured resources, which reduces control overhead because information identifying the punctured resources need not be transmitted to the receiver.

Figure 4C:
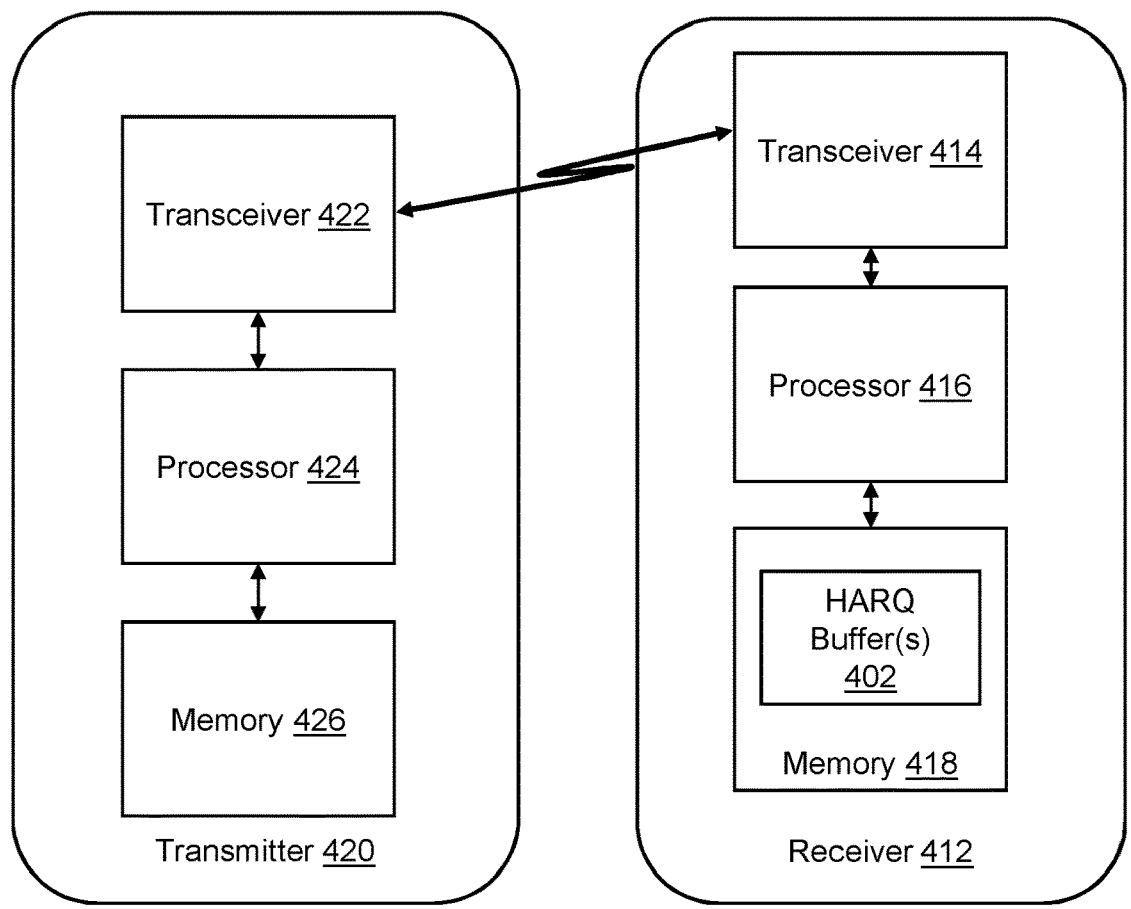
FIG. 4C is a block diagram of a transmitter and receiver in accordance with exemplary embodiments of the present invention.
Figure 4B:
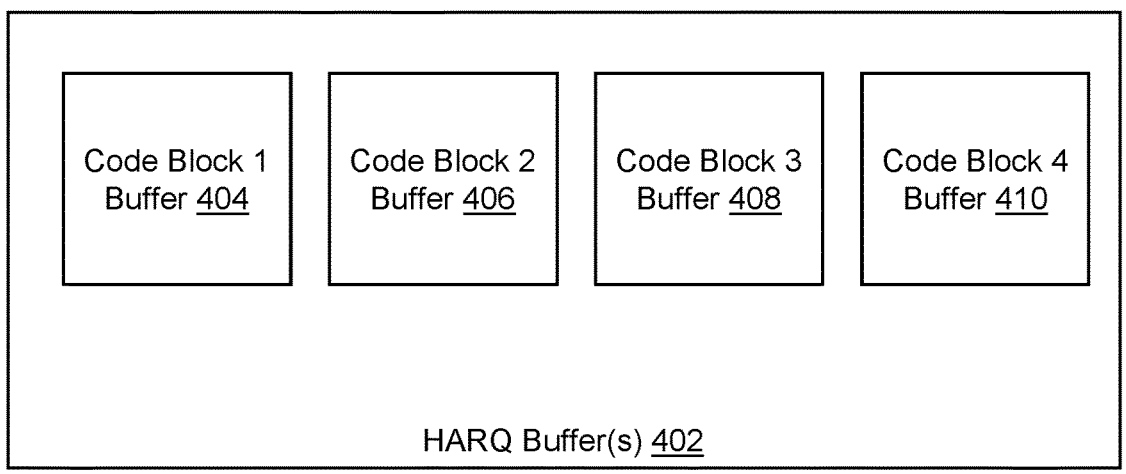
FIG. 4B is a block diagram of a HARQ buffer in a receiver in accordance with exemplary embodiments of the present invention.

A high-level description of an exemplary transmitter and receiver will be presented in connection with FIG. 4C to assist the reader in understanding the details of the implementation of the HARQ process of the present invention that follows. As illustrated, a transmitter 420 can transmit information to receiver 412, and receiver 412 can transmit information to transmitter 420. In order to accomplish this transmitter 420 includes a processor 424 coupled to a transceiver 422 and memory 426; and receiver 412 includes a processor 416 coupled to a transceiver 414 and memory 418. Processors 416 and 424 can be any type of processor or processing circuitry, such as a microprocessor, application specific integrated circuit (ASIC), field programmable gate array (FPGA), and/or the like. Memory 418 and 426 can be any type of memory and can include both transitory and non-transitory memory. The non-transitory memory can include code, which when executed by the associated processor, causes the processor to perform the methods described herein. The non-transitory memory can include a computer-readable medium storing the code. Although FIG. 4C illustrates the use of transceivers, separate transmitters and receivers can be provided, depending upon implementation. FIG. 4C is a high-level illustration of a transmitter 420 and receiver 412 and those skilled in the art will recognize that each can include additional components, such as input devices, interfaces to other devices, one or more antennas, one or more displays, etc. The transmitter 420 and receiver 412 can also be referred to as a transmitting node and receiving node, respectively.

The discussion below assumes only one transmitted layer; however, the number of feedback bits and DCI indication bits would increase if a higher number of transmitted layers is employed. Although the discussion below assumes the transmitter 420 is a base station (e.g., an eNB, a gNB, or any other type of base station) and the receiver 412 is a UE (user equipment), the invention can also be employed where the transmitter 420 is a UE and the receiver 412 is a base station, in which case the DCI indication may be transmitted as uplink DCI (UL-DCI). The term UE is intended to cover both devices having dedicated user, e.g., a smartphone, as well as devices that do not, e.g., sensors, actuators, etc. The present invention is also applicable in a sidelink scenario in which both the transmitter 420 and receiver 412 are UEs.

Figure 5:
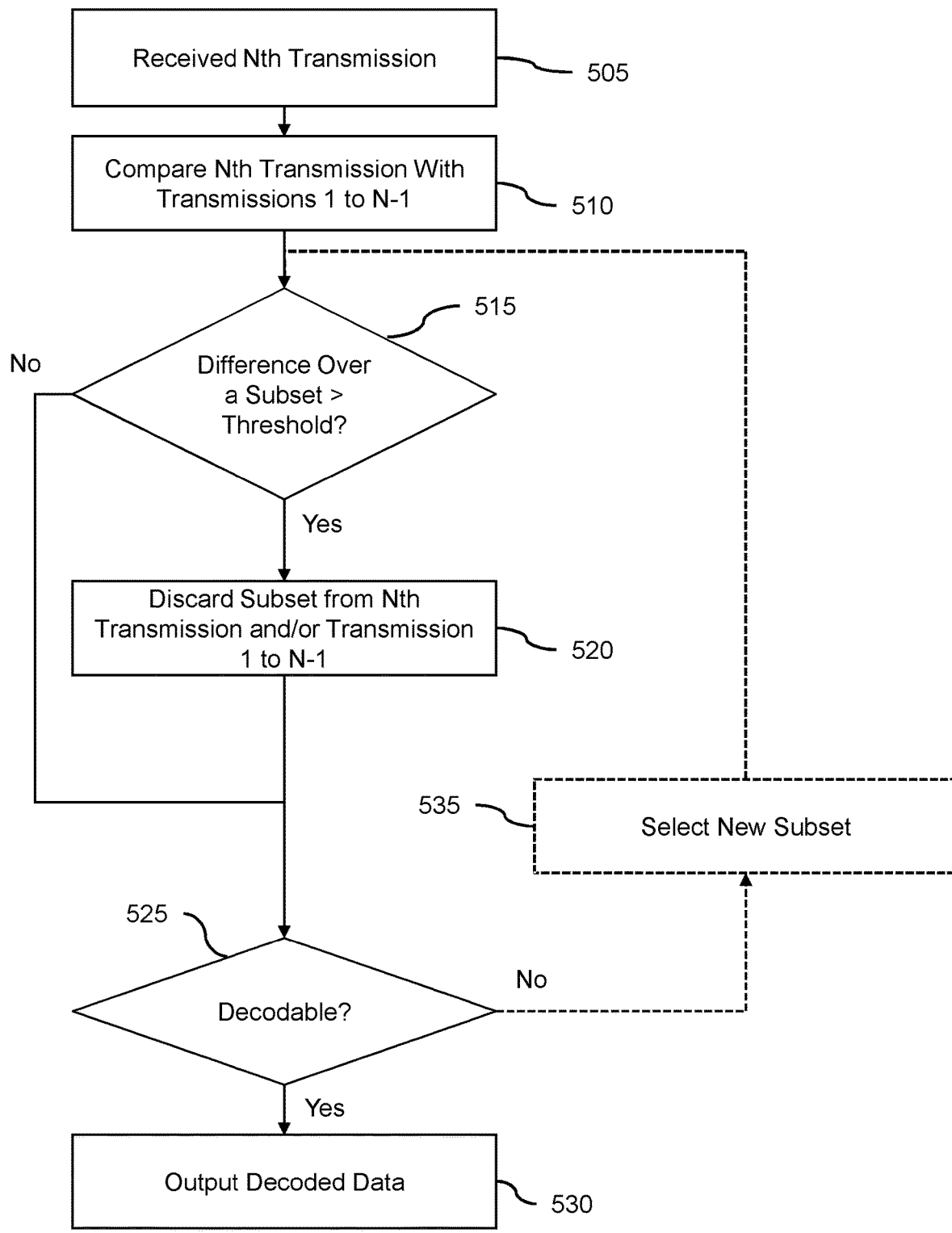
FIG. 5 is a flow diagram of an exemplary method for blind detection of punctured resources in accordance with exemplary embodiments of the present invention.

An exemplary method for blind detection of punctured resources by a receiver 412 will now be described in connection with FIG. 5. When the receiver 412 receives an Nth transmission (step 505), the receiver 412 compares the Nth transmission with previously received and buffered transmissions 1 to N−1 to determine a difference between the last received transmission and the one or more already received transmission(s) (step 510). In this case transmission 1 is an initial transmission and transmissions 2 to N are retransmissions of the initial transmission, the retransmissions can employ chase or incremental redundancy.

The difference can be calculated in a number of different ways. For example, the difference may be a sum or average over a numerical difference between corresponding points or may be characterized as an $l^p$-norm of the difference between the soft values or in-phase/quadrature (IQ) samples after demodulation. The difference could also be based on the calculated soft values (i.e., the soft values correspond to the points between which differences are computed). In another alternative, the difference is based on the IQ samples produced after demodulation (i.e., the IQ samples correspond to the points), which may be expected to be invariant between consecutive transmissions. In yet another alternative the difference is based on the estimated received modulated symbols, e.g., for example calculating the Euclidean distance in the IQ diagram or IQ plane.

The difference may be calculated over the entire frequency/time resource set or a subset of the overall frequency/time resource element set. In one aspect, the difference is calculated on a symbol-by-symbol basis. In another aspect, the difference is calculated over a pre-defined set of sub-carriers and time symbols, for example a PRB over a known TTI duration of 2 symbols. The subset can also be generated by dividing the overall bandwidth of the transmission into a plurality of bins. If desired, the subset can be restricted to a certain time interval or a set of time intervals, or to a certain frequency location or a set of frequency locations.

Another alternative is to calculate the difference on the basis of a number of samples distributed uniformly or non-uniformly with respect to time and/or frequency over the total number of samples. Typically, the number of samples on which the difference is based is significantly lower than the total number of samples; such 'finger-printing' may provide a reliable indication of whether puncturing has taken place without incurring too high computational cost.

The receiver 412 then determines whether the calculated difference exceeds a specific threshold (step 515). When the calculated difference exceeds a specific threshold ("Yes" path out of decision step 515), then a subset from the Nth and/or 1 to N−1 transmissions is discarded (step 520). The subset can be discarded by setting the soft bit values to 0. The discard subset can be only from the most recent transmission (i.e., the Nth transmission), from one or more of the previous transmissions (i.e., the 1 to N−1 transmissions), or all received transmissions.

After discarding one of the subsets (step 520) or if the difference is not greater than a threshold ("No" path out of decision step 515), then the receiver 412 attempts to decode using all of the transmissions (in the case of the "No" path out of decision step 515) or the non-discarded transmissions (after the discarding in step 520) and determines whether the decoding attempt was successful (step 525). If the decoding attempt was successful ("Yes" path out of decision step 525), then the decoded data is output for further processing as appropriate (step 530). If, however, the block is not decodable after discarding the subset or resources, the receiver 412 can select a new subset (step 535) and follow the same method using the newly selected subset (steps 515-535). In this case, the method can be repeated for a number of times corresponding to the number of previously received and buffered transmissions 1 to N−1.

Figure 6:
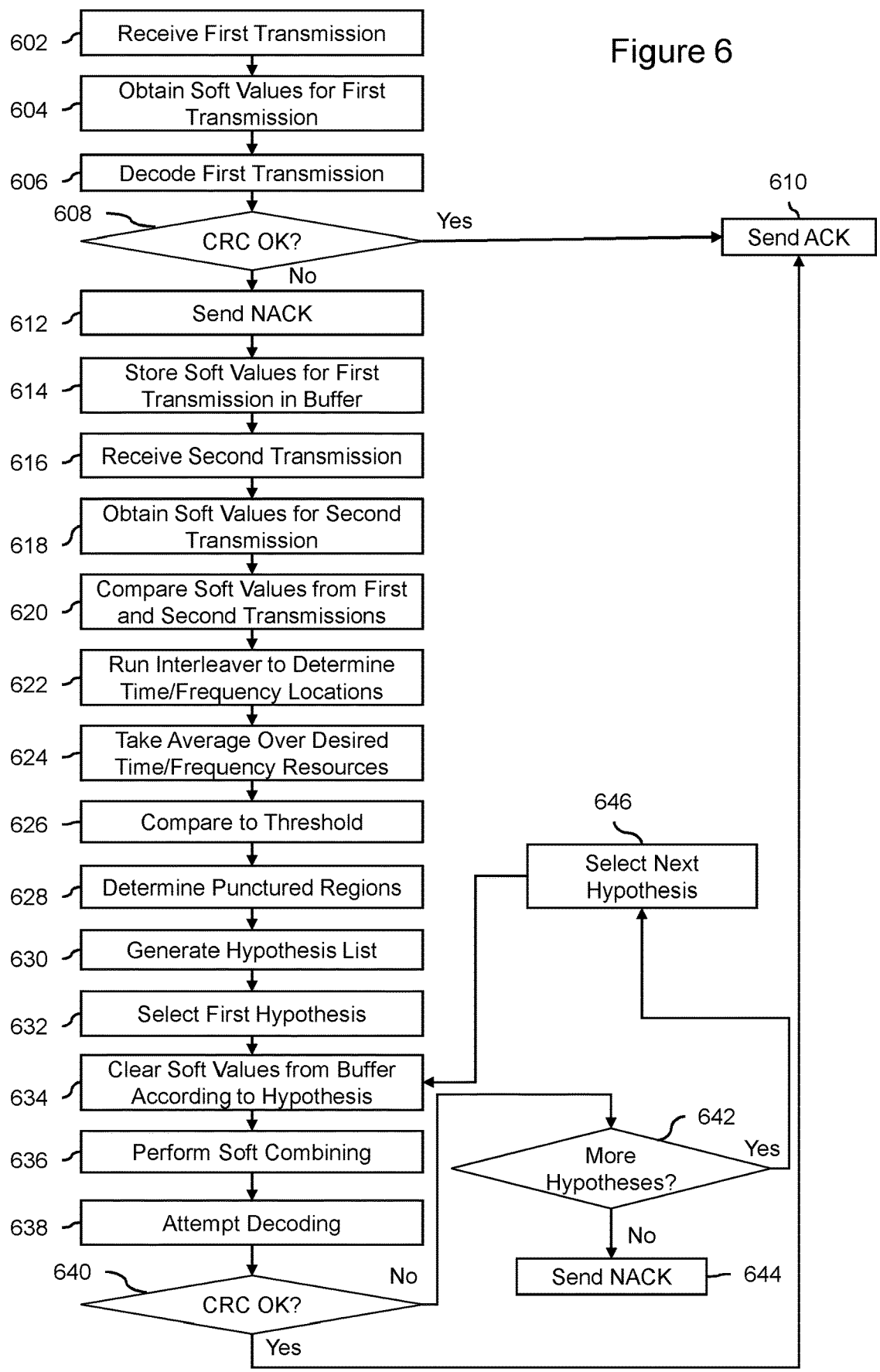
FIG. 6 is a more detailed flow diagram of an exemplary method for blind detection of punctured resources in accordance with exemplary embodiments of the present invention.

More details of the method of FIG. 5 will now be described in connection with the flow diagram of FIG. 6. The receiver 412 receives a first transmission (step 602) and obtains soft values for the first transmission (step 604). The soft values (equivalently: soft bits) are the input of a decoding processing matching a coding process implemented in the transmitter 420. Using the soft values, the receiver 412 attempts to decode the first transmission (step 606). The CRC (Cyclic Redundancy Check) is used to determine whether the decoding was successful. Accordingly, if the CRC is correct ("Yes" path out of decision step 608), the receiver 412 transmits a positive acknowledgement (ACK) to the transmitter 420 (step 610).

If the CRC is not correct ("No" path out of decision step 608), the receiver 412 transmits a negative acknowledgement (NACK) to the transmitter 420 (step 612) and stores the soft values for the first transmission in the HARQ buffer(s) 402 (step 614). The HARQ processing then waits for a second transmission, i.e., a retransmission, to perform another decoding attempt. During this time, the receiver 412 may or may not receive other transmissions that can be associated with other HARQ processes.

When the receiver 412 receives a second transmission of the data (step 616), the receiver 412 calculates soft values for the second transmission (step 618). This second transmission can be sent using Chase combining. Instead of using Chase combining, a set of soft values that only partly overlap with the first transmission can be used. The receiver 412 then compares soft values calculated from the first and second transmissions (step 620), runs an interleaver to determine correspondence between the time/frequency locations and soft values (step 622), and calculates a non-coherent (e.g., non-signed) average of the differences symbol by symbol to result in one value per symbol of the TTI (step 624). Alternatively, any of the techniques for calculating differences discussed above in connection with the method of FIG. 5 can likewise be employed in the method of FIG. 6.

Each of these one value per symbol is compared to a threshold and if the value is above the threshold it is determined that the symbol is punctured (step 626). The threshold can be a fixed threshold or can be variable, depending upon SNR (Signal-to-Noise Ratio) values, noise values, channel conditions, delay or Doppler spread estimates, etc.

This threshold comparison is then used to determine the regions of one of the received transmissions that have been punctured (step 628). For example, each symbol above the threshold can be selected as a region. A number of consecutive symbols can be joined into one region. In another alternative, the length of the puncturing occurrence is known (e.g., the length can be a standardized length, such as 2 symbols), and the detected regions are constructed according to this by splitting consecutive symbols into groups of 2. In an embodiment with fixed regions, if a detected length of consecutive symbols is not a multiple of the known puncturing occurrence length, it is determined to be two partly overlapping regions. For example, if samples 4, 5, 6 are detected to have changed, then one region is detected to be samples 4 and 5 and another region to be samples 5 and 6.

In one embodiment, the URLLC puncturing of the MBB transmissions cannot be placed on symbols carrying DMRS (Demodulation Reference Signals), as this would harm reception of the MBB transmission. Then the regions are determined according to this restriction. In another embodiment, the URLLC puncturing cannot be placed on resource elements carrying DMRS (Demodulation Reference Signals), because, again, this would harm reception of the MBB transmission. Thus, a fixed set of possible regions can be predefined at the transmitter that can be punctured by a URLLC transmission and the receiver 412 can evaluate transmissions received at each of the predefined possible regions to determine whether any puncturing occurred. The fixed set of possible regions does not necessarily have to correspond to the regions containing symbols carrying DMRS. This reduces the amount of processing at the receiver 412 because it only has to be concerned with puncturing occurring in a predefined set of possible regions instead of across all regions of a transmission.

The receiver 412 then generates a hypothesis list of which of the first and second transmissions has been punctured (step 630). The hypothesis list includes a hypothesis of which of the first and second transmissions have been punctured for each of the determined punctured regions. The hypothesis list can include a single hypothesis or more than one hypothesis. Generally, the hypotheses of which signals have been punctured are constructed choosing, for each region, that either one or both of the transmissions have been punctured, which results in $3^n$ hypotheses, where n is the number of regions. This process assumes at least one of the transmissions has been punctured. For example, if there are two detected regions there should be the following nine (i.e., $3^2$) hypotheses:

1. "First transmission punctured in both regions"
2. "First transmission punctured in first region, second transmission punctured in second region"
3. "First transmission punctured in second region, second transmission punctured in first region"
4. "First transmission not punctured, retransmission punctured in both regions"
5. "Both transmissions punctured in both regions"
6. "Both transmissions punctured in first region, first transmission punctured in second region"
7. "Both transmissions punctured in first region, second transmission punctured in second region"
8. "Both transmissions punctured in second region, first transmission punctured in first region"

9. "Both transmissions punctured in second region, second transmission punctured in first region"

The present invention can be implemented so that the transmitter is only allowed to puncture the first transmission and not subsequent transmission (i.e., retransmissions). Thus, the first hypothesis above would not valid in this situation, which reduces the total number of hypothesis required to be tested.

If there are too many hypotheses a subset of hypotheses can be selected for evaluation. In the example above the subset can include only the first three hypotheses because these are more likely to occur than the others.

The receiver 412 then selects the first hypothesis (step 632) and clears soft values from the HARQ buffer 402 according to the selected first hypothesis (step 634). The receiver 412 then performs soft combining using the sets of soft values selected according to the first hypothesis (step 636) and attempts to decode the combined soft values (step 638). If the decoding attempt was successful, which is determined based on the CRC being correct, ("Yes" path out of decision step 640), the receiver 412 sends an ACK to the transmitter 420 (step 610).

If, however, the decoding attempt was not successful ("No" path out of decision step 640), then the receiver 412 determines whether there are additional hypotheses in the hypothesis list (step 642). If there are not additional hypotheses in the hypothesis list ("No" path out of decision step 642), then the receiver 412 transmits a NACK to the transmitter 420 (step 644). If there are additional hypotheses in the hypothesis list ("Yes" path out of decision step 642), then the receiver 412 selects the next hypothesis (step 646) and clears the soft values from the buffer according to the next hypothesis (step 634) and repeats the soft combining and decoding (step 636 and 638).

An example of the hypotheses testing can involve a difference measurement of 14 symbols and detection of two regions to have puncturing but it is not yet known whether punctured occurred in first transmission, the second transmission, or both.

The 14 symbols are illustrated below where "." denotes no puncturing. "X" denotes detected puncturing, i.e., value above threshold.

..XX...XX.....

Assume the received soft values from the first transmission are:

AAAAAAAAAAAAAA

Also assume the received soft values from the second transmission are:

BBBBBBBBBBBBBB

The first hypothesis is tested by discarding soft values from both regions of the first reception, and combining with all values from the second transmission as follows (the dashes "-" below correspond to the punctured regions denoted above with an "X"):

AA--AAA--AAAAA
BBBBBBBBBBBBBB

The second hypothesis is tested by discarding values from the first part of the first transmission and from second part of second transmission as follows:

AA--AAAAAAAAAA
BBBBBBB--BBBBB

The third hypothesis is tested by discarding values from the second part of the first transmission and from first part of second transmission as follows:

AAAAAAA--AAAAA
BB--BBBBBBBBBB

Finally, the fourth hypothesis is tested by keeping all soft values from the first transmission, and discarding BOTH regions from the second transmission as follows:

AAAAAAAAAAAAAA
BB--BBB--BBBBB

It should be recognized that not all of the method steps have to be performed in the same order as illustrated. For example, the interleaver can be run at different locations of the method or it can be run only once with the resulting mapping saved in a memory.

According to one exemplary embodiment puncturing may occur on DMRS resources in one or more of the transmissions. The determination of puncturing regions can then be based on detection of DMRS puncturing, which can be achieved by comparing channel estimates with other time/frequency locations. For slowly varying channels and unchanged frequency allocation the comparison can be made to a previous transmission. One alternative is to compare to closely placed time/frequency resources, for example if the same TTI uses multiple DMRS locations in time or if bundling is used for neighboring resource blocks so that the same precoder is used. Another way of detecting DMRS puncturing is that the variance or amplitude of raw channel estimates is different than in an ordinary (non-punctured) subframe.

If all or most of DMRS resources are punctured the channel estimates may be useless and all soft values from this transmission may be discarded.

If some of the DMRS resources are punctured, while channel estimates still are expected to be useful, the information about punctured DMRS resources can be used to determine punctured regions. Soft values corresponding to punctured resources may then be discarded, following the other embodiments disclosed herein (possibly using several hypotheses), and the punctured DMRS resources may also be excluded from the channel estimation filtering. Due to the worse channel estimation, the soft values corresponding to this transmission may be downscaled, to reflect the larger uncertainty.

In one embodiment, the set of detected punctured regions is re-evaluated several times (in the hypothesis evaluation loop). The re-evaluation can be, for example, to check different threshold levels or to only use a subset of the detected punctured regions in the construction of hypotheses. Using multiple threshold levels makes it possible to obtain a probability on the different puncturing sets, where the process can first start out by evaluating hypotheses based on the puncturing locations with the highest probability. In the exemplary nine hypotheses list above, hypotheses could be added as, for example, "First transmission not punctured, retransmission punctured in first region"—i.e., a hypothesis is constructed that does not use the second detected region.

For sake of completeness it will be recognized the subset can also be the empty set, i.e., decoding in any step is done assuming that puncturing has not occurred, which is similar to the conventional operation without any puncturing. The evaluation of subsets of the detected regions can also be viewed as for each transmission and each region, choosing whether or not to flush those soft values. Thus, the number of hypotheses will be $2^{(\#transmissions \times \#regions)}$.

Although exemplary embodiments have been described in connection with HARQ buffer 402, depending upon implementation the HARQ buffer 402 may or may not include buffers for different code blocks. For example, if the system does not employ code blocks, different buffers or a shared buffer can be employed using transport blocks or any other division of transmitted data.

Although exemplary embodiments have been described as involving only a single retransmission (i.e., the second transmission), the present invention can also be implemented when there is more than one retransmission. In this case the number of possible hypotheses will increase and processing load can be reduced by selecting a subset of the hypotheses as discussed above.

Although exemplary embodiments described above involve a transmission punctured by the transmitter by another transmission, the present invention can also be employed with transmissions subjected to time/frequency limited interference, i.e., the interference occurs over limited regions in time and frequency. By detecting where the where the interference has occurred, the interference can be removed from the different transmission attempts just in the same way as done for puncturing.

When subjected to interference, which can come from the same base station that transmits the intended transmission, from another base station, from another communication system, or any other form of interference, there may be parts of the original transmission still existing in the received signal, although with a lower SINR level. Estimating the SINR level allows some parts of the soft values to be kept instead of completely removed. Thus, the discussion above related to removing soft values can be replaced by down-scaling of soft values, which makes them less important in the soft combining.

Although exemplary embodiments have been described in connection with blind detection in which the receiver does not receive any information about the puncturing from the transmitter, the present invention can also be used when the transmitter provides some information about the puncturing to the receiver. In one embodiment, the transmitter can send information to the receiver about the data being punctured, examples of which will be described in more detail below. This information can be about punctured regions or transmissions. The amount of transmitted puncturing information may be limited, with the smallest amount of information being a simple indication that some part of a transmission has been punctured, or contain more information, such as some form of indication of different time or frequency resources, or different code blocks. In embodiments described in more detail below, this information can be conveyed as a blanking indicator, which is based on physical layer properties of the transmission and indicating that the transmission was partially blanked and which can be used to identify buffers containing corrupted soft values.

Due to the potentially limited nature of the information, in one embodiment, the receiver uses information obtained from the network, and improves it. This can, for example, involve narrowing down a coarse indication to being more specific, using: knowledge that puncturing did occur, and then using the methods of the invention to determine exact symbol positions; knowledge that puncturing did occur on certain symbols, and then using the methods of the invention to determine affected parts of the frequency band; information about code blocks or groups of code blocks, and determine affected symbols; or information about symbols or groups of symbols, and determine affected code blocks. Alternatively, this can involve using knowledge from the network about puncturing length as part of the determination of puncturing regions. Another alternative involves extending information from the network to include more punctured regions, extending puncturing information.

Although exemplary embodiments have been described in connection with comparing soft values of a retransmission against soft values of a retransmission, these embodiments can also be employed in connection with repetition encoding in which several soft values are received for the same encoded bit in very low rate transmissions. Thus, the comparisons can be between two or more of the several soft values instead of between two or more soft values from a transmission and retransmission.

The embodiments described above involve removing values in soft value buffers that have a large difference between a transmission and one or more retransmissions. In certain situations, soft values having large differences can be useful for correct channel decoding of the retransmission. In this case, joint measures of sets of soft values can be employed to improve the reliability of detecting the correct set of soft values.

Additional exemplary embodiments of the present invention provide ways for a receiver to identify portions of a transmission from a transmitter that is partly punctured by another transmission by the transmitter. The portions can be identified based on an indicator, which indicates the transmission was partly punctured. The receiver then determines, based on physical layer properties of the indicated transmission, which portions of the soft buffers needs to be flushed. In one embodiment, the receiver flushes all soft information related to the indicated transmission. In another embodiment, the receiver determines one or more soft information candidates where each candidate uses soft information partly flushed according a possible blanking pattern. In a further other embodiment, the receiver evaluates received energy in the time-frequency resources where it was assigned the transmission. If the received energy is evaluated to be unexpectedly low for certain time-frequency resources that also matches a potential blanking pattern, the receiver flushes the corresponding soft information for the indicated transmission. These additional exemplary embodiments will now be described in connection with FIGS. 7A-10.

The processing of signals transmitted by a transmitter to a receiver involved in the decoding by excluding punctured portions based on a received indicator will now be described in connection with the methods of FIGS. 7A and 7B.

Figure 8:
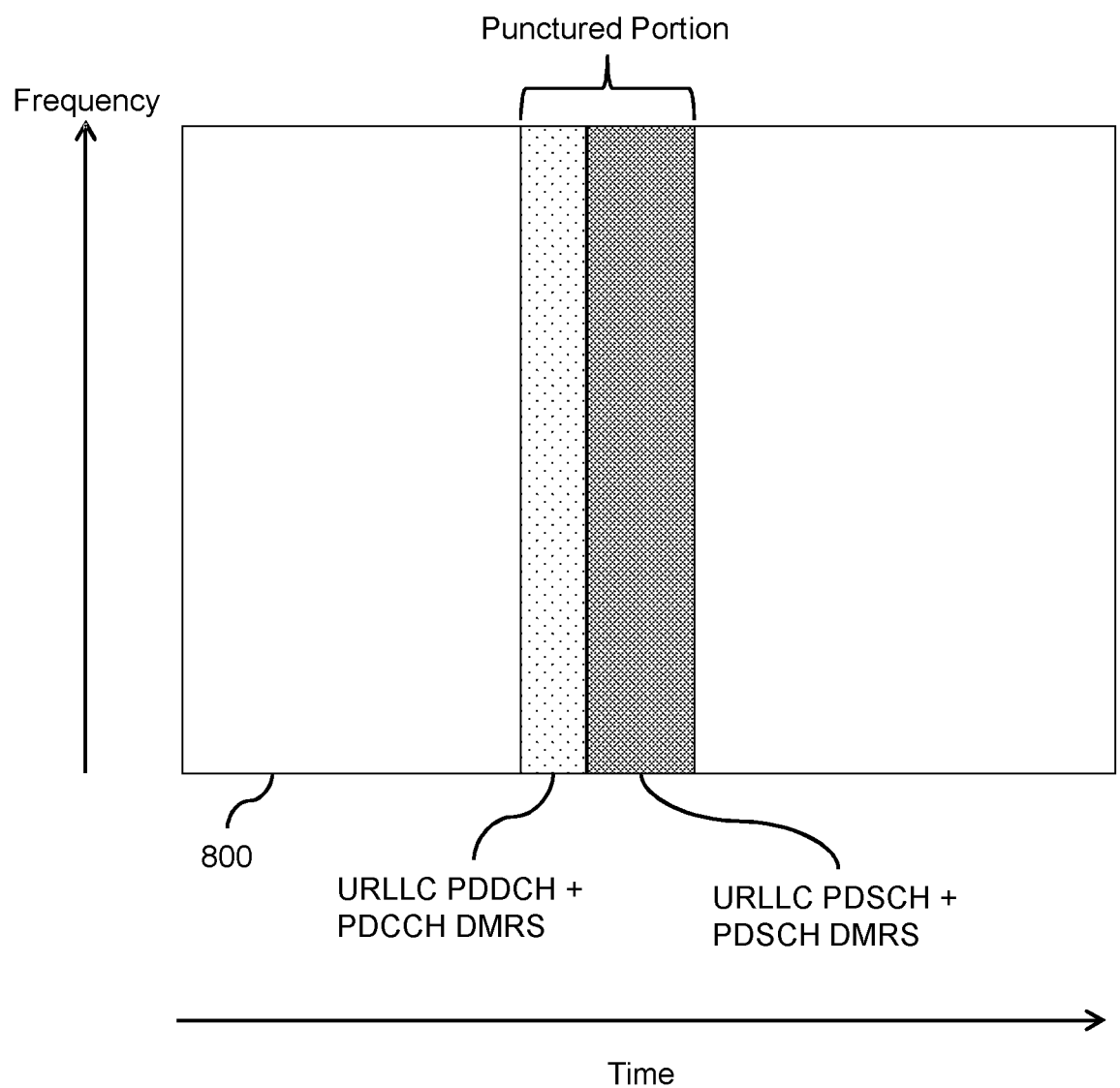
FIG. 8 is a block diagram of a punctured transmission in accordance with exemplary embodiments of the present invention.

Initially, the receiver 312 receives a first transmission from a transmitter (step 705). An example of such a transmission is illustrated in FIG. 8, in which a MBB transmission 800 is punctured by an URLLC transmission in the punctured portion. In this embodiment, the URLLC transmission consists of a control information part comprising DMRS (Demodulation Reference Signals) for demodulation of the control information and data part comprising DMRS for demodulation of data.

Figure 7A:
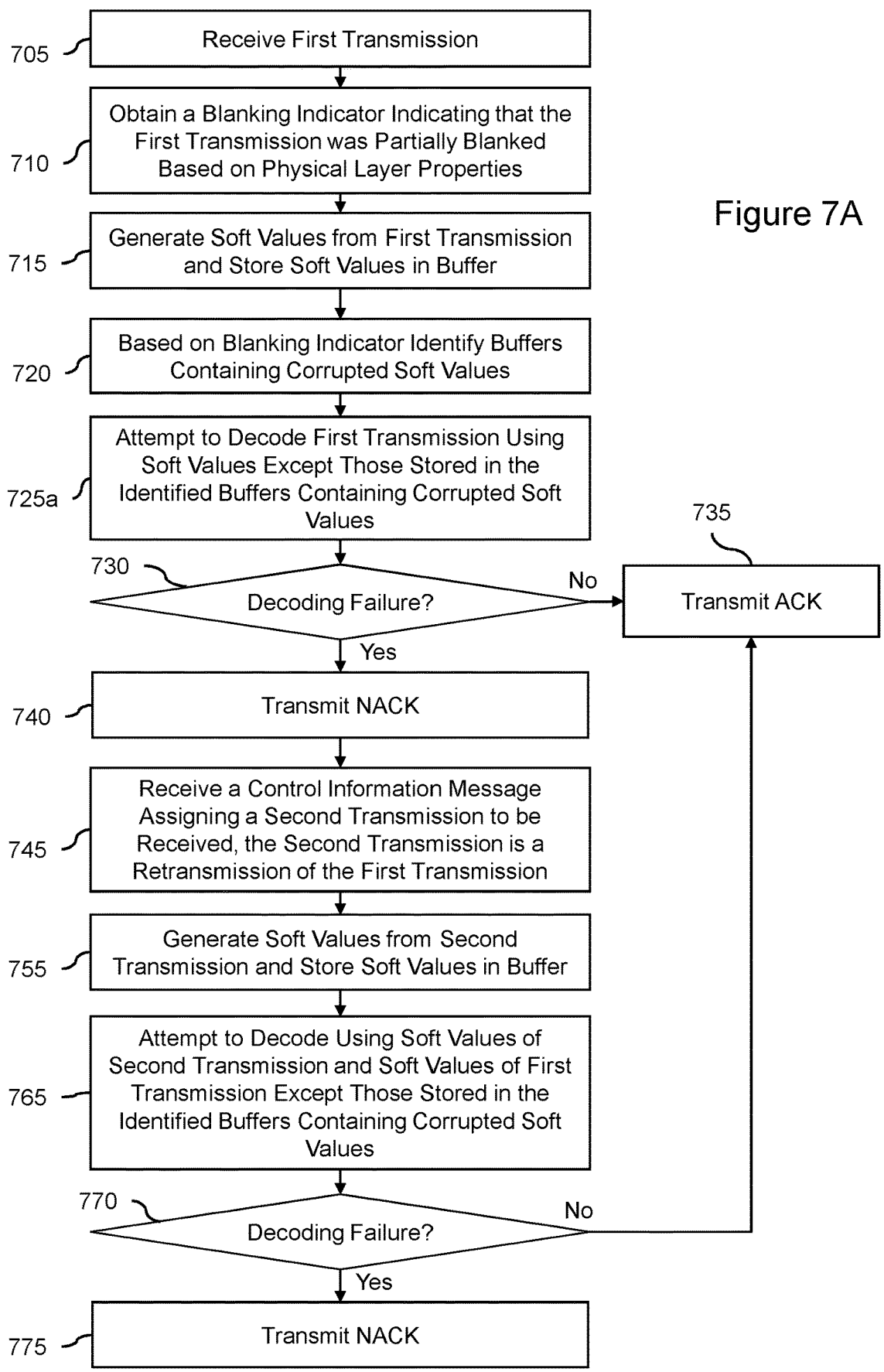
FIGS. 7A and 7B are flow diagrams of methods in accordance with exemplary embodiments of the present invention.
Figure 7B:
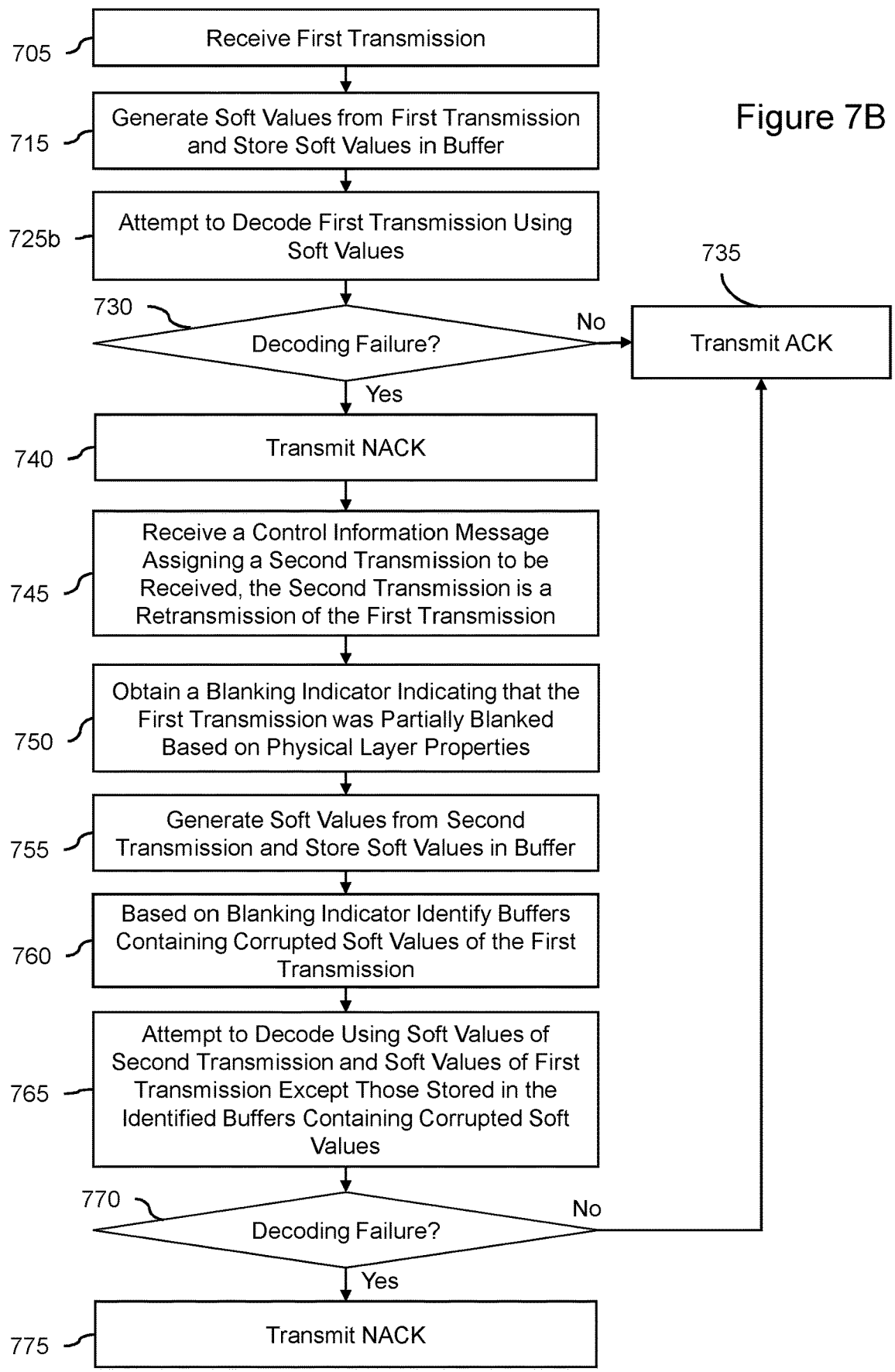

In the method of FIG. 7A the receiver 312 of the MBB transmission is configured to attempt to detect the DMRS for the URLLC PDCCH (Physical Downlink Control Channel) within the MBB transmission. The receiver 312 can be configured in this manner using RRC (Radio Resource Control) information message configuring the receiver 312 to detect that blanking is occurring if a specific reference signal is detected (in this case URLLC PDCCH DMRS). The blanking indicator may be a detection of the URLLC PDCCH DMRS, and thus the data in the soft buffer corresponding to this time-frequency location of the URLLC PDCCH DMRS may be corrupted.

Accordingly, the receiver 312 obtains a blanking indicator via the RRC information message (step 710), generates soft values from the first transmission and stores the soft values in the HARQ buffer 302 (step 715), and uses the blanking indicator to identify the buffers containing corrupted soft values due to the punctured transmission (step 720). The receiver then attempts to decode the first transmission using the soft values in the buffer 302 except for the soft values stored in the buffers identified as containing corrupted soft values (step 725a). If the decoding was successfully ("No" path out of decision step 730), the receiver 312 transmits an ACK to the transmitter 320 (step 735).

If the decoding was not successful ("Yes" path out of decision step 730), then the receiver 312 transmits a NACK to the transmitter 320 (step 740) and waits for a retransmission. As part of the retransmission, the receiver 312 receives a control information message assigning a second transmission to be received, the second transmission being a retransmission of the first transmission (step 745). The receiver 312 then generates soft values from the second transmission and stores the soft values in the buffer 302 (step 755). The receiver then performs a decoding attempt using the soft values of the second transmission and the soft values of the first transmission except those stored in the buffers identified as containing corrupted soft values (step 765). If the decoding attempt is successful ("No" path out of decision step 770), then the receiver 312 transmits an ACK to the transmitter 320 (step 735). If, however, the decoding was not successful ("Yes" path out of decision step 770), then the receiver 312 transmits a NACK (step 775) and a further retransmission may occur (not illustrated).

As an alternative to using RRC information messages to configure the receiver 312 to detect the blanking, the receiver 312 can receive an indicator comprised in the assignment of the retransmission indicating that the soft buffer of last transmission was partly corrupted by a blanking decision. The blanking indicator will only indicate the soft buffer was partly corrupt if the receiver 312 detects the URLLC PDCCH DMRS and the receiver 312 is informed by control signaling that a certain part of the soft buffer should not be used in the combining. This may be beneficial in scenarios in which URLLC and MBB are co-scheduled without entirely blanking the MBB transmission in the URLLC time-frequency resources. This may also be used when the URLLC and MBB are spatially different, i.e., the beamforming directions for URLLC and MBB transmission are significantly different. Hence, the transmitter 320 may use MU-MIMO (Multi-User Multiple-Input Multiple-Output) for multiplexing of URLLC and MBB when possible. In such situations it may be desirable for the receiver 312 to receive the MBB transmission despite detecting URLLC PDCCH DMRS. This may be indicated in the re-transmission assignment. In other implementations MU-MIMO is used but the MBB will be highly interfered by the URLLC transmission. In such case the retransmission assignment may indicate that the determined part of the soft buffer should not be used in the combining.

Figure 9:
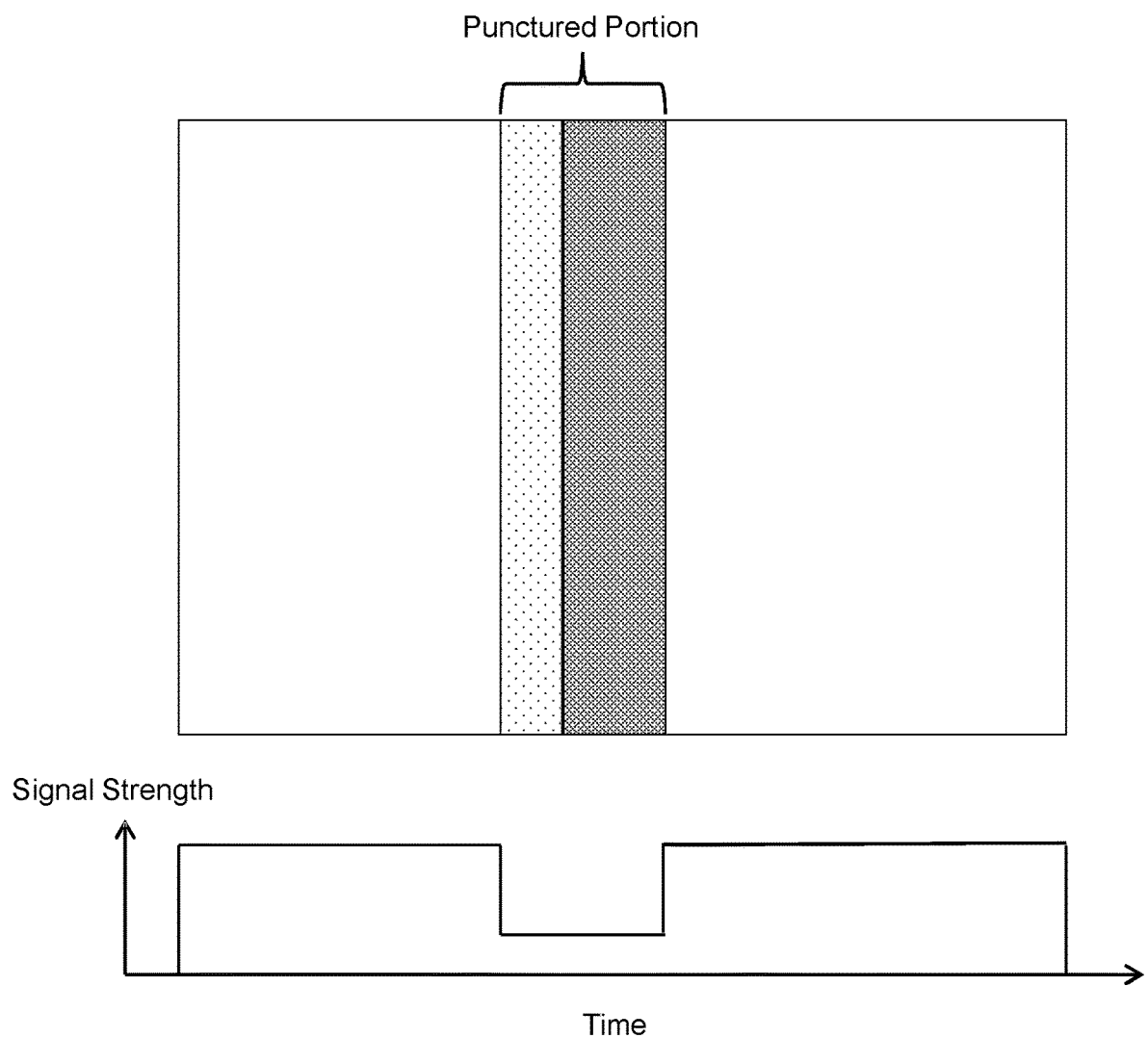
FIG. 9 is a block diagram of a punctured transmission involving beamforming in accordance with exemplary embodiments of the present invention.
Figure 10:
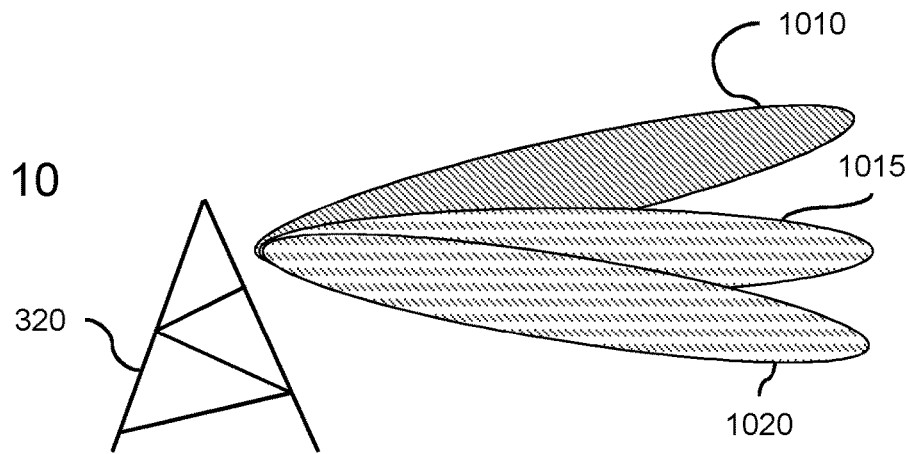
FIG. 10 is a block diagram of a base station employing beamforming for transmission in accordance with exemplary embodiments of the present invention.

As an alternative to the receiver 312 being configured to detect the blanking, the receiver can employ received signal strength as a blanking indicator. An example of this is illustrated in FIGS. 9 and 10. Specifically, the transmitter 320 can employ beamforming to control the signal strength of the intended MBB transmission to the receiver 312 and the signal strength of the punctured region. As illustrated in the example of FIG. 10, transmitter can use beamforming to transmit the punctured portion (e.g., the URLLC transmission) in beam 1010 and the MBB transmission in beams 1015 and 1020. In order to minimize interference caused by the transmission of the punctured portion in beam 1010, beam 1015 can carry an unpunctured MBB transmission but beam 1020 can carry a punctured MBB transmission. Thus, due to spatial separation between beams 1010 and 1020, the receiver 312 will receive the URLLC transmission in the punctured portion at a lower signal strength than the non-blanked portions of the MBB transmission intended for the receiver 312.

The use of signal strength to identify the punctured portion will now be described in connection with FIG. 7B, which is similar to the method of FIG. 7A except that the blanking indicator is obtained after the failure to decode the first transmission (step 750), and thus the blanking indicator is not used during the initial decoding of the first transmission but instead is used when the decoding involves both the first and second transmissions (steps 760 and 765). However, the blanking indicator can be obtained at any time after the first transmission has been received because at that time the receiver 312 can measure the signal strength across the entire first transmission.

Accordingly, when the receiver 312 makes the second decoding attempt (step 765), the receiver 312 will have a new set of soft values per OFDM symbol from the second transmission of the data, S2={s0, ... }, that can be compared with the soft values per OFDM symbol of the first transmission, S1={s0, ... }. Given S1 and S2, and the signal power level per received OFDM symbol, P1={p0, ... } in the first transmission, and P2={p0, ... } in the second transmission, the soft values can be given different weight, as a modification of the receiver combination (e.g. MRC (maximal-ratio combining)). For example, the weights of the soft symbols for an OFDM symbol in a transmission is a product of the relative power and the absolute power of the received OFDM symbols:

$$w_{k,i} = p_{k,i}/p_{k\_av} * p_{k,i},$$

Where $p_{k,i}$ is the received power of OFDM symbol i in transmission k, and $p_{k\_av}$ is the average received power of transmission k. The weight $w_{k,i}$ is then used by the receiver 312 to assign weights to the soft values. In the simplest form this would be weighing the combined soft value as:

$$s_i = (w_{1,i} * s_{1,i} + w_{2,i} * s_{2,i})/(w_{1,i} + w_{2,i}),$$

where $s_i$ is the output soft value for OFDM symbol 1, and $s_{1,i}$ and $s_{2,i}$ are the input soft values from the first and second transmission, respectively. The effect of the weighing is that the punctured (blanked) OFDM symbols are essentially flushed from the soft buffer, since the received power of these symbols will be relatively low, given that the puncturing transmission has a different beamforming characteristic. As an alternative to dividing the soft values onto OFDM systems, the soft values can be divided on code blocks, or sub-code blocks, and the indexing and weighing is based on this division.

The receiver 312 needs to consider the size of the URLLC data when the receiver 312 starts performing decoding, where it detects URLLC PDCCH DMRS at the re-transmitted MMB data, because the URLLC PDCCH DMRS might be overlapped with the soft buffer. For example, the blanked resources may be covering two OFDM symbols while the URLLC PDCCH DMRS may only cover one OFDM symbol.

Calculating the size of the URLLC data allows the determination of the part of the soft buffer part corresponding to a number of OFDM symbols comprising the PDCCH DMRS as well as the subsequent OFDM symbols. In addition, the calculated size of the URLLC data that the receiver 312 is supposed to receive can be conveyed to the receiver 312 before the retransmitted data is delivered, for example using RRC signaling. For instance, if the receiver detects PDCCH DMRS at OFDM x, then the determined soft buffer part corresponds (overlaps with) OFDM symbols x, x+1, ..., x+a, where x+a is the last OFDM symbols in the overlapping area.

If the MBB transmission consists of multiple code blocks, then the receiver 312 can determine the soft buffer part based on code blocks for which decoding fails. Because a transport block transmitted in the downlink might include a number of code blocks, the division into code blocks is in the time domain of the transmitted symbols such that a code block starts and ends in a given OFDM symbol. For example, a first code block covers the first four OFDM symbols and a second CB covers the subsequent 3 OFDM symbols According to another alternative the DMRS of the URLLC PDCCH may cover a subset of sub-carriers (part of frequency band) but blanking occurs for a larger set of sub-carriers. For example, if DMRS for URLLC PDCCH is detected in a frequency band $[sc_{start}, sc_{end}]$, which is the range of sub-carriers where URLLC PDCCH DMRS was detected, the receiver 312 can determine the total URLLC transmission to cover the sub-carriers $[sc_{start}-a, sc_{end}+b]$ where a and b integers.

A combination of the above-mentioned alternatives can used to determine a time-frequency area of resource that is considered by the wireless device to be blanked. For example, the area that is determined by the wireless device to be blanked may be smaller or equal to the actual blanked area or it could be larger.

Implementation of any of the embodiments discussed above may depend on the beamforming method used for MBB transmission. If analog beamforming is used only the alternatives involving whole OFDM symbols can be used, while digital beam-forming can also use a determined frequency range.

According to another embodiment the transmitter 320 can provide a blanking assignment to the receiver 312. For example, the URLLC transmissions are assigned using a DCI (Downlink Control Information) with a CRC bitmap matching the RNTI (Radio Network Temporary Identity) of the intended receiver for the scheduled URLLC transmission. The receiver 312 that is intended to receive the MBB transmission is the configured with one or more blanking assignment RNTIs (or a range of RNTIs using a bitmap). When the receiver 312 that is intended to receive the MBB transmission is assigned a PDSCH transmission it will attempt to detect one or more blanking assignments during (within) the assigned time-frequency resources. If the receiver 312 that is intended to receive the MBB transmission detects one or more blanking assignments for one of the configured blanking assignment RNTIs, the receiver 312 determines a part of the soft buffer for its assigned MBB transmission based on the one or more blanking assignments. Accordingly, a URLLC DCI scheduling URLLC transmission being transmitted on blanked MBB resources will be interpreted as a blanking assignment by the receiver 312 intended to receive the MBB transmission.

Although the method of FIG. 7A was described in connection with the receiver 312 being configured to detect punctured portions through signaling and the method of FIG. 7B was described in connection with the use of signal strength to detect punctured portions, the method of FIG. 7A can be employed with the use of signal strength and other features described in connection with FIG. 7B and the method of FIG. 7B can be employed with the receiver being configured to detect punctured portions through signaling and other features described in connection with FIG. 7A. Thus, exemplary embodiments of the present invention cover any of the disclosed techniques employing detected punctured portions in both the decoding of the initial transmission and retransmission(s) as described in connection with FIG. 7A, as well as any of the disclosed techniques employing detected punctured portions only for retransmission(s) as described in connection with FIG. 7B.

Figure 11A:
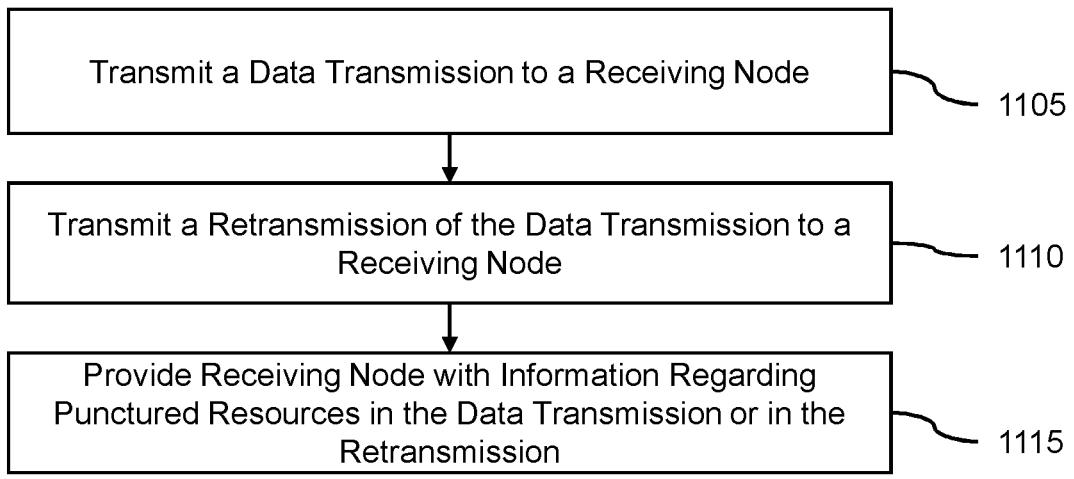
FIGS. 11A and 11B are flow diagrams of exemplary methods for a transmitter to identify punctured resources to a receiver in accordance with exemplary embodiments.

Methods for a transmitter 420 to identify punctured resources to a receiver 412 will now be described in connection with FIGS. 11A and 11B. Referring first to FIG. 11A, the transmitter 420 transmits, via transceiver 422, a data transmission to a receiver 412 (step 1105). The transmitter 420 transmits a retransmission of the data transmission to the receiver 412 (step 1110). The transmitter 420 then provides the receiver 412 with information regarding punctured resources in the data transmission or the retransmission (step 1115).

Figure 11B:
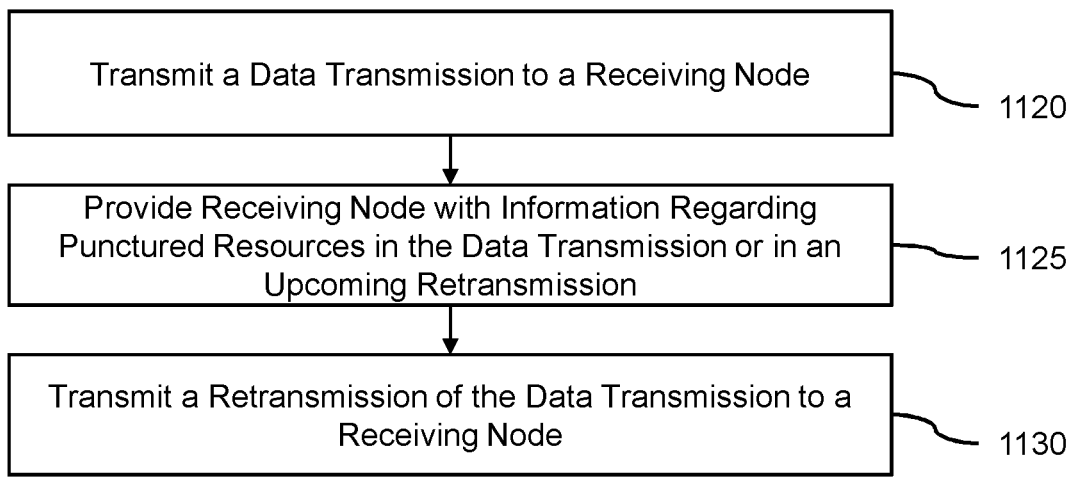

Turning now to FIG. 11B, the transmitter 420 transmits, via transceiver 422, a data transmission to a receiver 412 (step 1120). The transmitter 420 then provides the receiver 412 with information regarding punctured resources in the data transmission or an upcoming retransmission (step 1125). The transmitter 420 transmits a retransmission of the data transmission to the receiver 412 (step 1130).

Thus, in the method of FIG. 11A, the information regarding the punctured resources is provided after transmitting the data transmission and the retransmission, whereas in the method of FIG. 11B, the information regarding the punctured resources is provided after transmitting the data transmission and before transmitting the retransmission.

Consistent with the discussion above with respect to the receiver 412, the information regarding punctured resources is used by the receiving node to create the hypotheses list or to identify the punctured regions. Further, the information regarding punctured resources only indicates that some part of one of the data transmission and the retransmission was punctured. Additionally, the information regarding punctured resources is a blanking indicator, which is based on physical layer properties of the data transmission or the retransmission and which indicates the data transmission or the retransmission was partially blanked. Moreover, the blanking indicator can indicate which of a plurality of buffers in the receiving node contains corrupted soft values. The information regarding punctured resources is provided to the receiving node via a radio resource control (RRC) message.

Those skilled in the art will readily appreciate the benefits of the embodiments disclosed herein. Simulations comparing the embodiments with solutions based only on the use of the NDI may be used to quantify this advantage.

Thus, the embodiments disclosed in this section provide radio communication systems, devices and methods for enabling blind detection of punctured resources or partially blind detection, as well as radio communication systems, devices and methods for decoding a received transmission by excluding punctured portions of the transmission based on a blanking indicator. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments might be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A method implemented in a receiving node, the method comprising:
    receiving a data transmission from a transmitting node;
    comparing values of the received data transmission with values of a previously received data transmission to determine a difference between the values of the received data transmission and the values of the previously received data transmission;
    comparing the determined difference to a threshold to detect regions with corrupted data of the data transmission, regions with corrupted data of the previously received data transmission, or regions with corrupted data of one of the data transmission and regions with corrupted data of the previously received data transmission; and
    from a hypotheses list of which of the data transmission and the previously received data transmission have been punctured, selecting a hypothesis and performing the following using the selected hypothesis:
        clearing values from a buffer according to the selected hypothesis;
        soft combining using sets of values selected according to the selected hypothesis to produce combined values; and
        attempting to decode the combined values,
    wherein, when the attempt to decode is not successful and when the hypotheses list includes another hypothesis, the other hypothesis is selected from the hypotheses list and the clearing, soft combining, and attempting to decode are performed according to the other hypothesis.

2. The method of claim 1, wherein the values of the received data transmission and of the previously received data transmission are soft values.

3. The method of claim 1, further comprising forming the hypotheses list on the basis of an assumption chosen from a group comprising:
    an assumption that the data transmission was punctured;
    an assumption that one of the data transmission and the previously received data transmission was punctured;
    an assumption that at least one of the data transmission and the previously received data transmission was punctured.

4. The method of claim 1, wherein the regions with corrupted data are punctured or blanked regions.

5. The method of claim 1, wherein the values of the received data transmission and of the previously received data transmission are in-phase/quadrature (IQ) samples.

6. The method of claim 1, wherein the received data transmission is a Chase combined retransmission of the previously received data transmission.

7. The method of claim 1, wherein the difference is an average difference over predefined time-frequency resources.

8. The method of claim 7, wherein the predefined time-frequency resources is one orthogonal frequency-division multiplexing (OFDM) symbol.

9. The method of claim 1, wherein the difference is a sum or average over a numerical difference between corresponding points in the received data transmission and the previously received data transmission.

10. The method of claim 9, wherein the points are soft values for the received data transmission and the previously received data transmission.

11. The method of claim 9, wherein the points are IQ samples of the received data transmission and the previously received data transmission.

12. The method of claim 1, wherein the difference is based on estimated received modulated symbols of the received data transmission and the previously received data transmission.

13. The method of claim 12, wherein the difference is based on a calculated Euclidean distance between the estimated received modulated symbols of the received data transmission and the previously received data transmission in an IQ diagram or in an IQ plane.

14. The method of claim 1, wherein the difference is an norm of the difference between soft values or IQ samples after demodulation of the received data transmission and the previously received data transmission.

15. The method of claim 1, the difference is calculated over a subset of an overall frequency-time resource element set for the received data transmission and the previously received data transmission.

16. The method of claim 15, wherein the difference is calculated per single modulated symbol.

17. The method of claim 1, wherein the difference is calculated over a predefined set of sub-carriers and time symbols of the received data transmission and the previously received data transmission.

18. The method of claim 1, wherein the difference is calculated using a number of samples distributed over time or frequency over a total number of samples of the received data transmission and the previously received data transmission.

19. The method of claim 1, wherein the receiving node receives information regarding punctured resources, the received information being used to create the hypotheses list or to identify the punctured regions.

20. The method of claim 19, wherein the information regarding punctured resources only indicates that some part of one of the received data transmission and the previously received transmission was punctured.

21. The method of claim 1, further comprising:
    obtaining a blanking indicator, which is based on physical layer properties of the data transmission or the previously received data transmission and which indicates the data transmission or the previously received data transmission was partially blanked.

22. The method of claim 21, wherein the buffer comprises a plurality of buffers and the blanking indicator indicates which of the plurality of buffers contains corrupted soft values.

23. The method of claim 1, wherein the values of the received data transmission and values of the previously received data transmission are from predefined portions of the respective transmission.

24. The method of claim 23, wherein the predefined portions are portions that do not carry a demodulation reference symbol (DMRS).

25. The method of claim 1, wherein the data transmission and the previously received data transmission contain a same encoded bit that the transmitting node repetition encoded.

26. A receiving node comprising: a wireless interface and processing circuitry configured for:
 receiving a data transmission from a transmitting node;
 comparing values of the received data transmission with values of a previously received data transmission to determine a difference between the values of the received data transmission and the values of the previously received data transmission;
 comparing the determined difference to a threshold to detect regions with corrupted data of the data transmission, regions with corrupted data of the previously received data transmission, or regions with corrupted data of one of the data transmission and regions with corrupted data of the previously received data transmission; and
 from a hypotheses list of which of the data transmission and the previously received data transmission have been punctured, selecting a hypothesis and performing the following using the selected hypothesis:
  clearing values from a buffer according to the selected hypothesis;
  soft combining using sets of values selected according to the selected hypothesis to produce combined values; and
  attempting to decode the combined values,
 wherein, when the attempt to decode is not successful and when the hypothesis list includes another hypothesis, the other hypothesis is selected from the hypotheses list and the clearing, soft combining, and attempting to decode are performed according to the other hypothesis.

27. A method implemented in a transmitting node, the method comprising:
 transmitting a data transmission to a receiving node;
 transmitting a retransmission of the data transmission to the receiving node; and
 sending to the receiving node information regarding punctured resources in the data transmission or in the retransmission, wherein the information regarding punctured resources only indicates that some part of one of the data transmission and the retransmission was punctured,
 wherein the information regarding punctured resources is a blanking indicator, which is based on physical layer properties of the data transmission or the retransmission and which indicates the data transmission or the retransmission was partially blanked, and wherein the blanking indicator indicates which of a plurality of buffers in the receiving node contains corrupted soft values.

28. The method of claim 27, wherein the information regarding punctured resources is sent to the receiving node via a radio resource control (RRC) message.

29. The method of claim 27, wherein the information regarding the punctured resources is sent after transmitting the data transmission and before transmitting the retransmission.

30. The method of claim 27, wherein the information regarding the punctured resources is sent after transmitting the data transmission and the retransmission.

31. A transmitting node comprising: a wireless interface and processing circuitry configured for:
 transmitting a data transmission to a receiving node;
 transmitting a retransmission of the data transmission to the receiving node; and
 sending to the receiving node information regarding punctured resources in the data transmission or in the retransmission, wherein the information regarding punctured resources only indicates that some part of one of the data transmission and the retransmission was punctured,
 wherein the information regarding punctured resources is a blanking indicator, which is based on physical layer properties of the data transmission or the retransmission and which indicates the data transmission or the retransmission was partially blanked, and wherein the blanking indicator indicates which of a plurality of buffers in the receiving node contains corrupted soft values.

* * * * *